Figure 1:
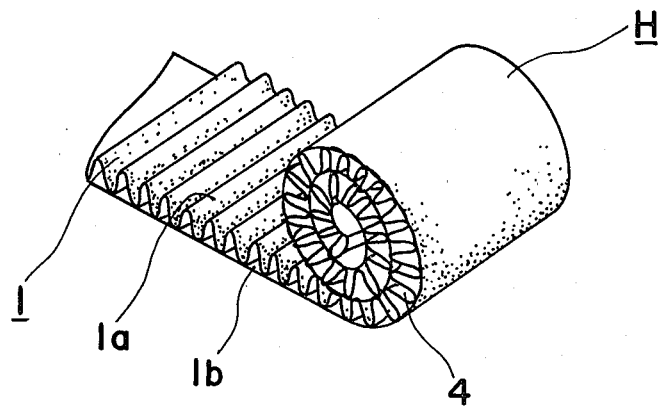

United States Patent [19]

Imamura

[11] 4,391,616

[45] Jul. 5, 1983

[54] METHOD OF DEHUMIDIFICATION

[75] Inventor: Yoshio Imamura, Kyoto, Japan

[73] Assignee: Toyo Boseki Kabushiki Kaisha, Japan

[21] Appl. No.: 285,692

[22] Filed: Jul. 21, 1981

[30] Foreign Application Priority Data

Jul. 24, 1980 [JP] Japan .............................. 55-102064

[51] Int. Cl.³ ............................................ B01D 53/04
[52] U.S. Cl. ........................................ 55/35; 55/181;
55/390; 55/527; 55/34
[58] Field of Search ................... 55/31, 32, 34, 60, 77, 55/78, 181, 208, 387, 388, 390, 524, 33, 35, 74, 527, 528

[56] References Cited

U.S. PATENT DOCUMENTS

| | | | |
|---|---|---|---|
| 2,134,544 | 10/1938 | Ashley | 55/34 X |
| 3,368,327 | 2/1968 | Munters et al. | 55/388 X |
| 3,557,534 | 1/1971 | Kennedy | 55/35 X |
| 3,666,007 | 5/1972 | Yoshino et al. | 55/387 X |
| 3,850,785 | 11/1974 | McQuade et al. | 55/527 X |
| 3,925,021 | 12/1975 | Yoshino et al. | 55/388 X |
| 4,013,566 | 3/1977 | Taylor | 55/387 X |
| 4,040,804 | 8/1977 | Harrison | 55/33 X |
| 4,046,939 | 9/1977 | Hart | 55/74 |
| 4,134,743 | 1/1979 | Macriss et al. | 55/390 X |
| 4,160,059 | 7/1979 | Samejima | 55/387 X |
| 4,172,164 | 10/1979 | Meyer et al. | 55/390 X |
| 4,181,513 | 1/1980 | Fukuda et al. | 55/524 X |
| 4,234,326 | 11/1980 | Bailey et al. | 55/387 X |

FOREIGN PATENT DOCUMENTS 55-152529 11/1980 Japan .................................. 55/181

Primary Examiner—Robert H. Spitzer
Attorney, Agent, or Firm—Jones, Tullar & Cooper

[57] ABSTRACT

The disclosure is directed to a method of dehumidification of air or gas which includes the steps of preparing a dehumidifying member composed of active carbon fiber material in the form of sheets, and bringing air or gas to be dehumidified into contact with the dehumidifying member in a direction parallel to the sheets for a less air passing resistance.

21 Claims, 18 Drawing Figures

METHOD OF DEHUMIDIFICATION

The present invention generally relates to a method of dehumidification utilizing active carbon fibers and also, to a method of cooling which employs a cool air flow or cold water obtained through humidification of dry air after the dehumidification.

Commonly, for removing moisture or water content contained in air, gases, etc., various kinds of dehumidification arrangements have been utilized, most of which are arranged to bring wet gases into contact with a moisture adsorbent. Meanwhile, although molecular sieves, silica gel, alumina, etc. are widely employed as the moisture adsorbents, they have not been necessarily satisfactory for the purpose at all times. For example, the moisture adsorbents of the above described type, which are generally in granular shape, tend to produce a large pressure loss when air is caused to pass through a zone filled with such moisture adsorbents, with a consequent energy loss to an appreciable extent.

In order to overcome the disadvantage described above, there has conventionally been proposed a process in which the moisture adsorbents of the above described type are applied onto sheets of paper, cloth, film, etc. and air is flowed in a direction parallel to the sheets. In the known process described above, however, since an adhesive or bonding agent is employed for the application of the moisture adsorbents, the moisture adsorbents are not only reduced in the adsorbing capacity thereof, but tend to fall off the sheets during use. Meanwhile, the known moisture adsorbents described above require high temperatures in the region of 100° to 150° C. during regeneration thereof through removal of the moisture content, thus necessitating facilities therefore, accompanied by large of energy consumption. Moreover, since the above known moisture adsorbents do not have a very high in moisture adsorbing rate, the dehumidification capacity thereof per cycle can not be raised as desired.

On the other hand, the recent trend is such that cooling systems have been installed in various buildings, and are now spreading into homes in general.

In the dehumidifying and cooling arrangement described earlier in which water is caused to contact air, the air is normally dried to improve the evaporating efficiency of water, with the employment of molecular sieves, silicagel, alumina, etc. as the moisture adsorbents, but since such moisture adsorbents are not very high in adsorption rate, it has been difficult to maintain dehumidification and cooling performance sufficient for practical applications.

Accordingly, an essential object of the present invention is to provide a method of dehumidification which employs active carbon fibers capable of regeneration at temperatures lower than 80° C., with less air passage resistance for producing dry air at high efficiency.

Another important object of the present invention is to provide a method of dehumidification as described above and also an efficient dehumidifying and cooling system which employs no high pressure devices, chemicals, etc. thereby providing safe operation, without any pollution of environment.

A further object of the present invention is to provide a method of dehumidification and also an efficient dehumidifying and cooling system as described above in which a sheet of active carbon fibers in a layered structure easy to process or handle is employed, and in which, by causing air to flow in a direction parallel to the sheet, the air passage resistance is reduced, with a consequent decrease of pressure loss, and thus, the capacity of a blower for supplying air flow thereto may be lowered to achieve extremely high energy efficiency.

In accomplishing these and other objects, according to one preferred embodiment of the present invention, there is provided a method of dehumidifying air which comprises the steps of preparing a dehumidifying member composed of active carbon fiber material in the form of sheets, and bringing air to be dehumidified into contact with said dehumidifying member in a direction parallel to the sheets for the dehumidification of air. The active carbon fibers which can be regenerated at comparatively low temperatures present a low air passage resistance.

By the dehumidifying method according to the present invention as described above, not only dry air may be produced at high efficiency, but, in the applications thereof described in detail in the present specification, cold water or cool air flow for cooling purposes is readily obtained through a cool air flow generating device of simple construction.

Figure 2:
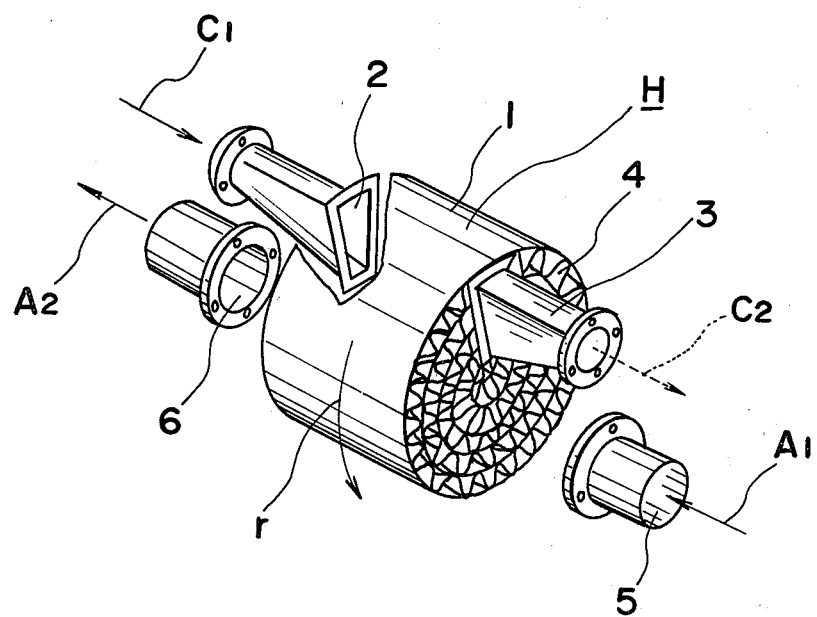
Figure 3:
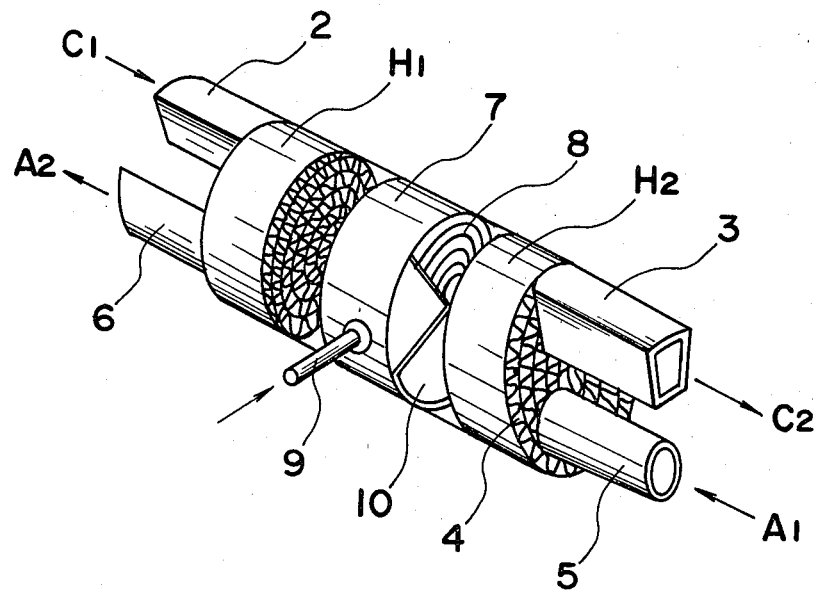
Figure 4:
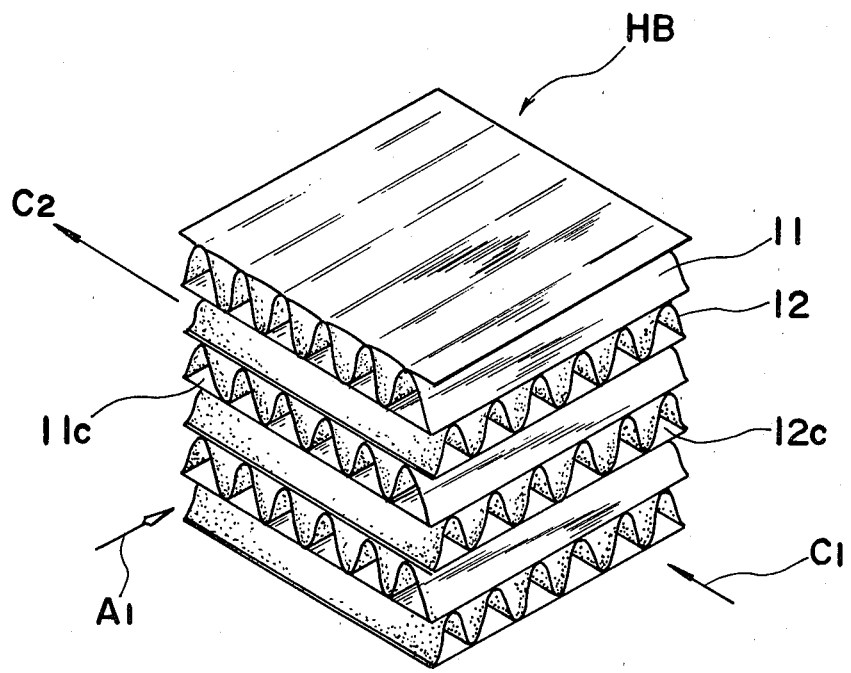
Figure 5:
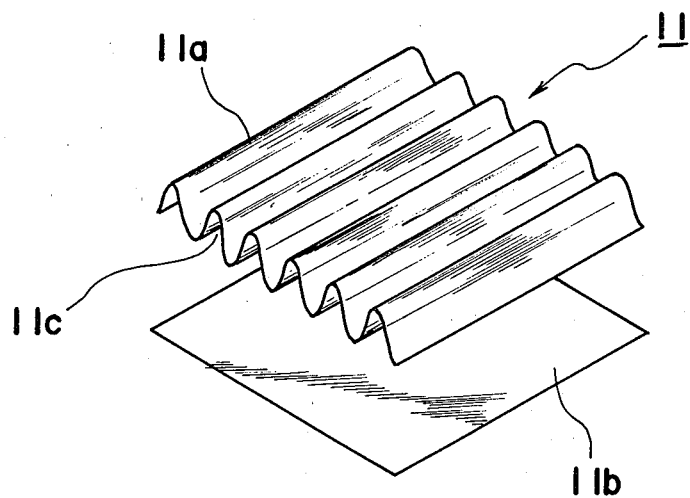
Figure 6:
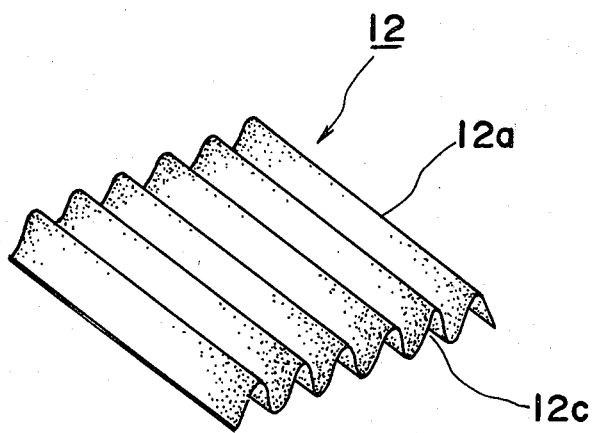
Figure 7:
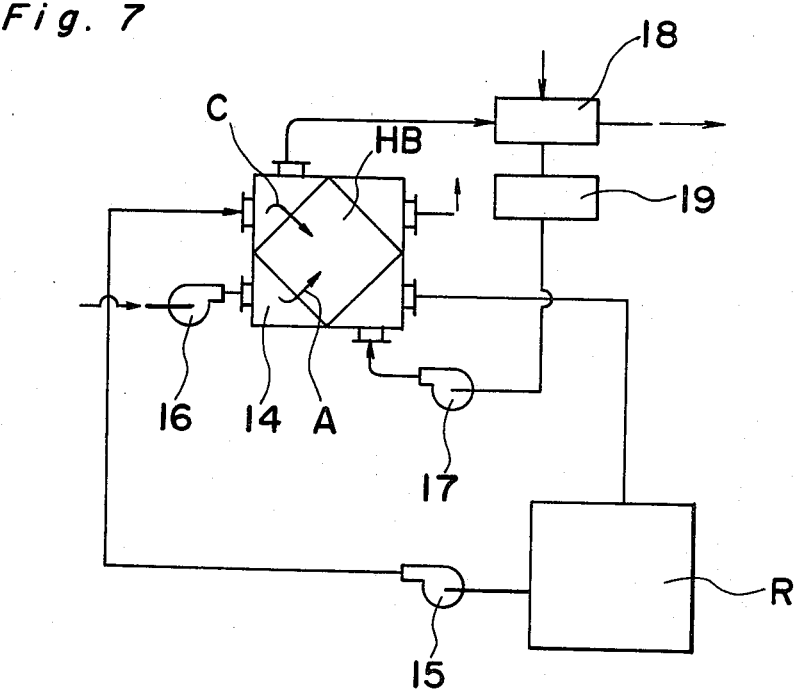
Figure 8:
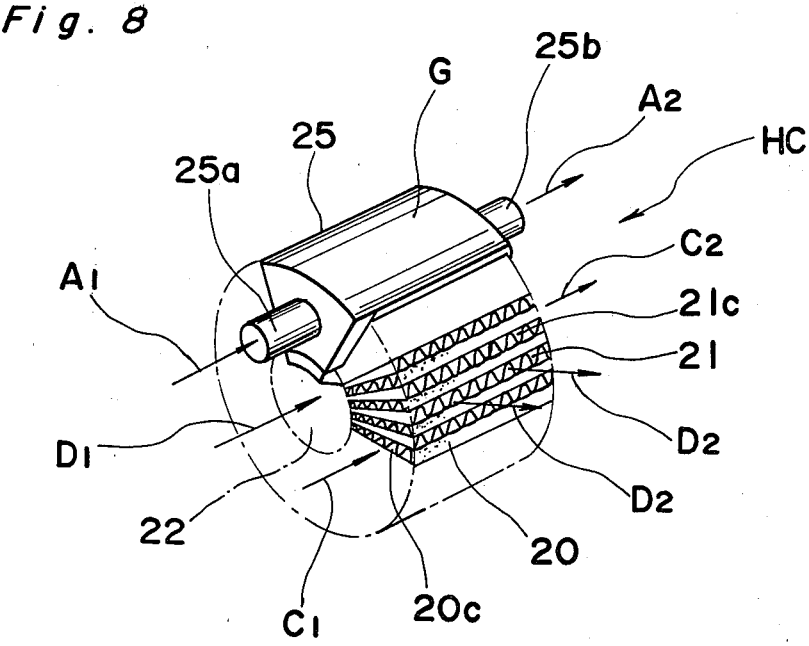
Figure 9:
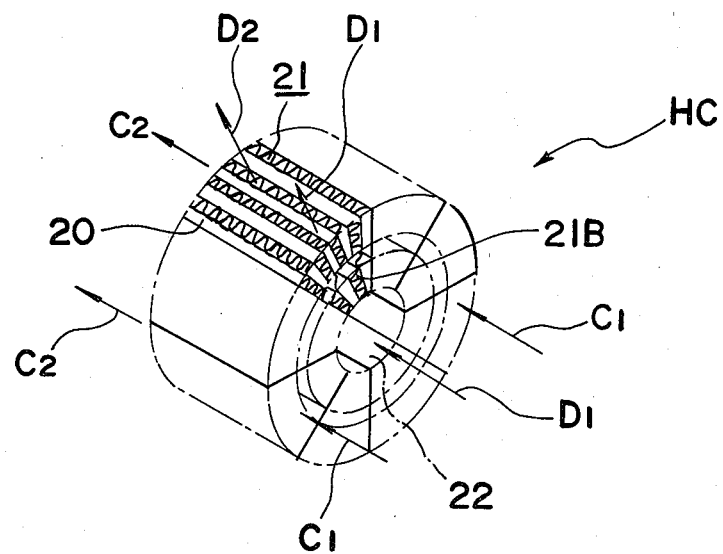
Figure 10:
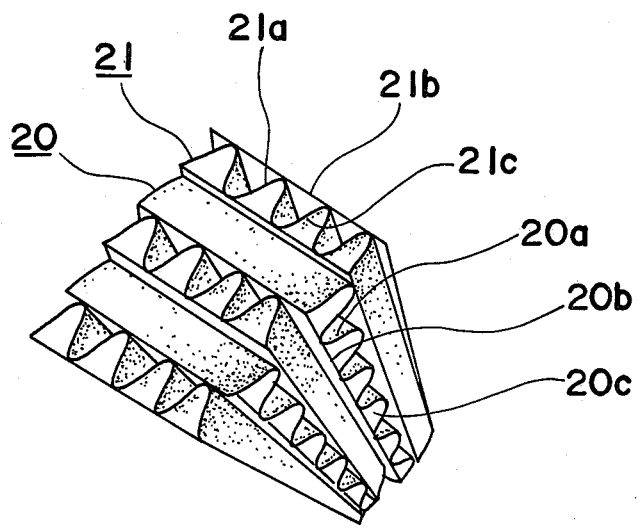
Figure 11:
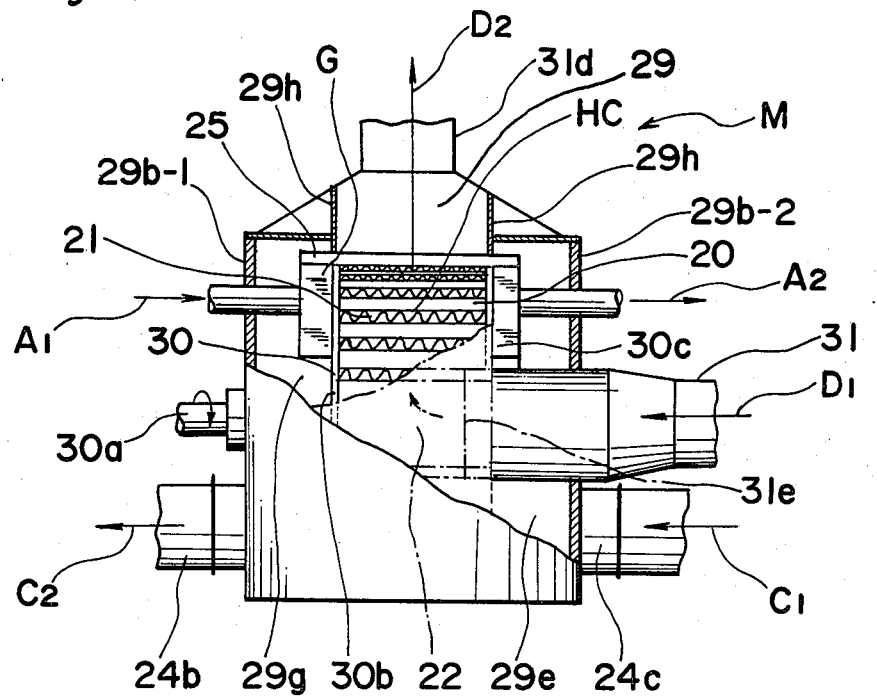
Figure 12:
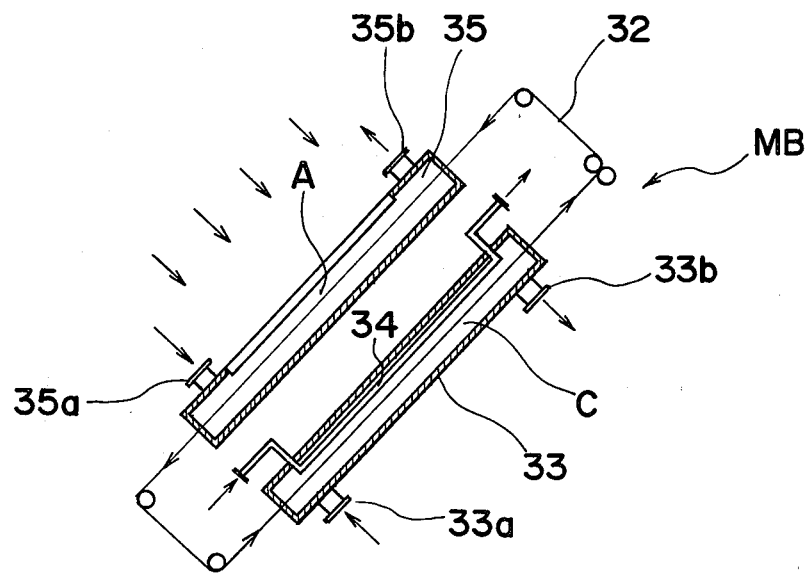
Figure 13:
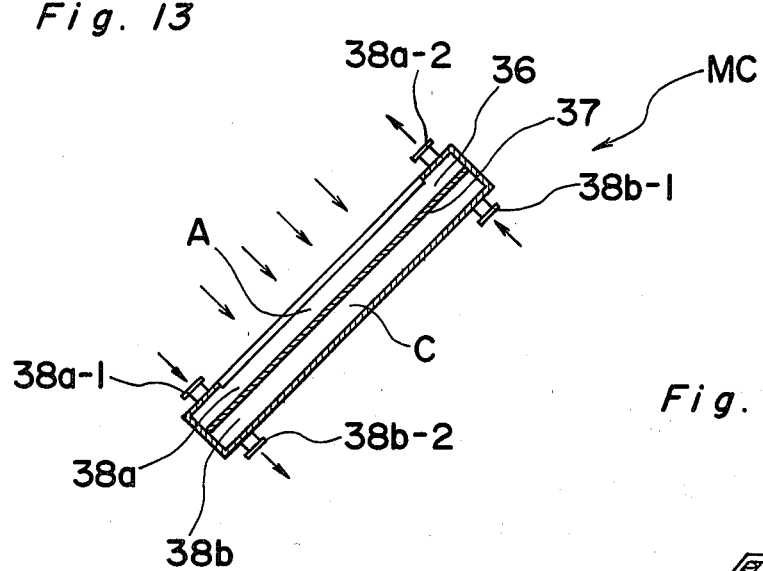
Figure 14:
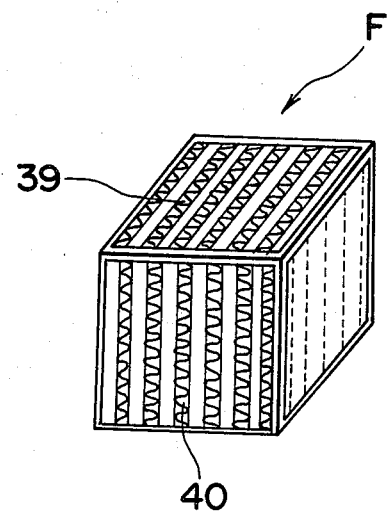
Figure 15:
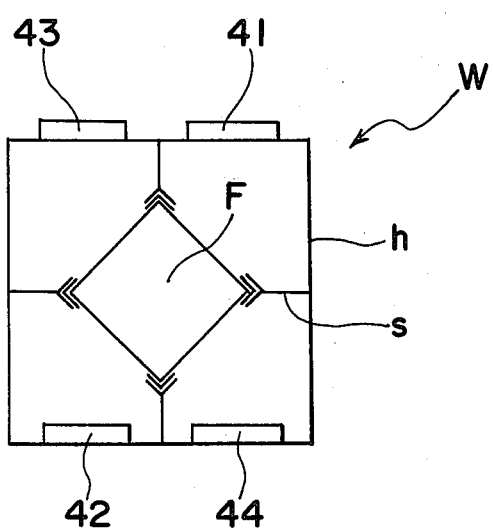
Figure 16:
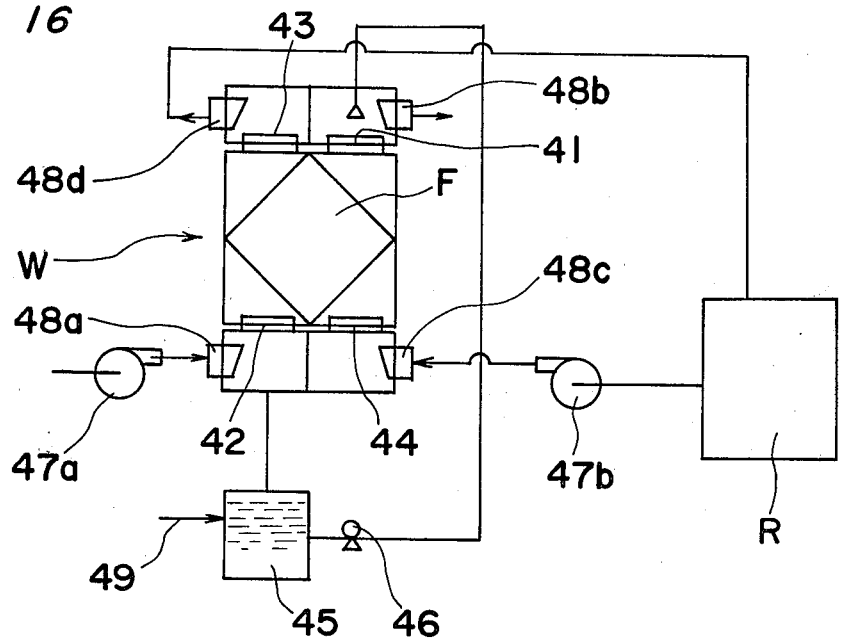
Figure 18:
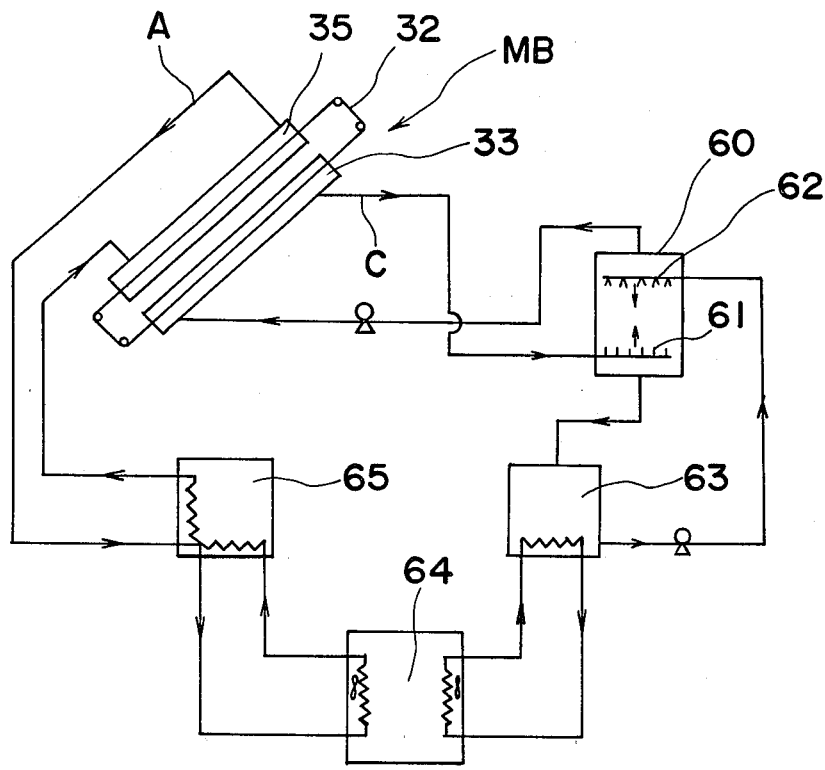
Figure 17:
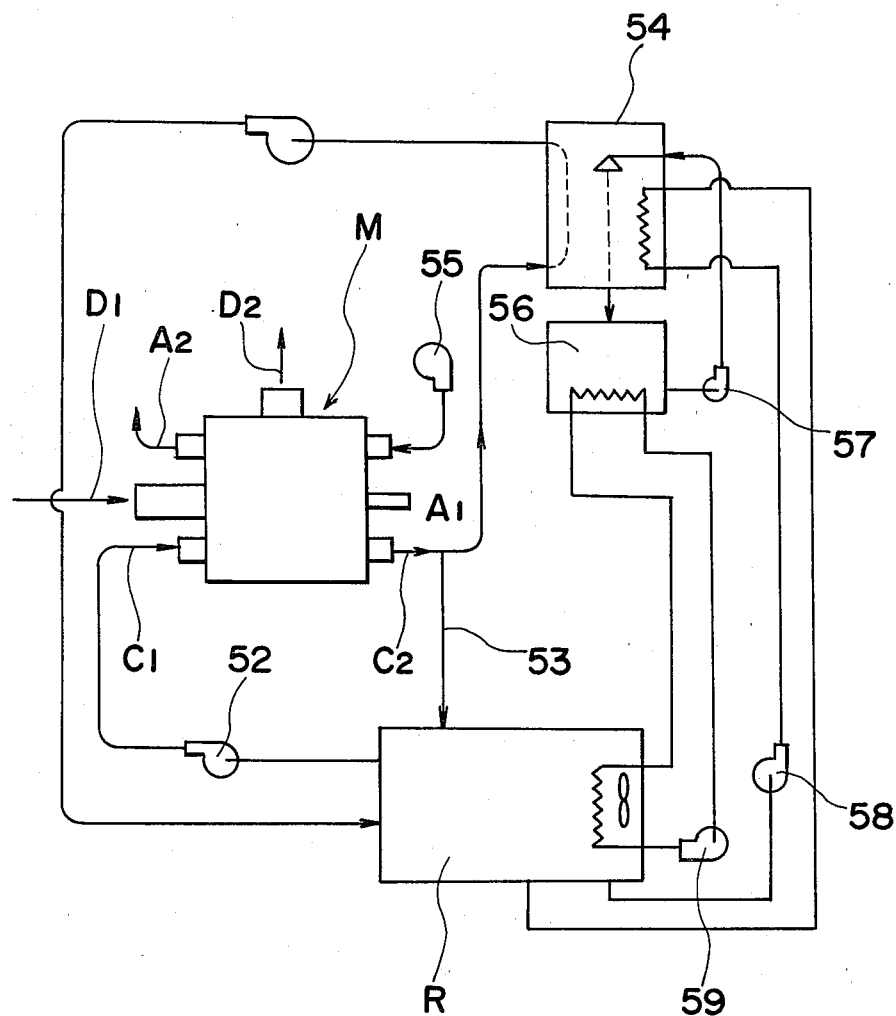

These and other objects and features of the present invention will become apparent from the following description taken in conjunction with the preferred embodiments thereof with reference to the accompany drawings, in which;

FIG. 1 is a perspective view showing one example of a dehumidifying member which is formed by spirally winding a moisture adsorbing element composed of a corrugated sheet and a flat sheet of active carbon fibers, and which may be applied to the methods of dehumidification and cooling according to the present invention, FIG. 2 is a view similar to FIG. 1, which particularly shows one example of application thereof, FIG. 3 is a view similar to FIG. 2, which particularly shows another example of application thereof, FIG. 4 is a perspective view showing one example of a single unit constituting a dehumidifying member which may be applied to the present invention, FIG. 5 is an exploded perspective view showing the construction of an air passing element employed in the dehumidifying member of FIG. 4, FIG. 6 is a perspective view of a moisture adsorbing element employed in the dehumidifying member of FIG. 4, FIG. 7 is a schematic diagram showing one example of a dehumidifying arrangement employing the dehumidifying member of FIG. 4, FIG. 8 is a perspective view showing one example of a rotary type dehumidifying member which may be applied to the present invention, FIG. 9 is a view similar to FIG. 8, which particularly shows another example thereof, FIG. 10 is a fragmentary perspective view showing, on an enlarged scale, part of the rotary type dehumidifying member of FIG. 9 for explaining the structure thereof, FIG. 11 is a side elevational view, partly broken away, showing one embodiment of a dehumidifying arrangement in which the rotary type dehumidifying member of FIG. 8 is incorporated, FIG. 12 is a schematic side elevational view showing a dehumidifying arrangement according to another embodiment of the present invention, FIG. 13 is a view similar to FIG. 12, which particularly shows a further embodiment thereof, FIG. 14 is a perspective view showing one embodiment of a cool air flow generating device which may be applied to the present invention, FIG. 15 is a schematic diagram showing one example of a cool air flow generating arrangement employing the cool air flow generating device of FIG. 14, FIG. 16 is a schematic diagram showing one example of a room interior cooling system employing the cool air flow generating arrangement of FIG. 15, FIG. 17 is a schematic diagram showing another example of a room interior cooling system which employs the dehumidifying arrangement of FIG. 11, and FIG. 18 is a schematic diagram showing a further example of the cooling system in which the arrangement of FIG. 12 is employed.

Before the description of the present invention proceeds, it is to be noted that like parts are designated by like reference numerals and symbols throughout several views of the accompanying drawings.

In the first place, it is to be noted that, as the active carbon fibers to be used in the method of dehumidification according to the present invention, cellulose fibers, phenol resin fibers, acrylic fibers, cross-linked polyolefin fibers, etc. are employed through carbonization and activation, in the form of non-woven fabric sheets, or paper-like sheets, or non-woven fabric sheets and the like produced by blending or mixing thereof with a small amount of other fibers, for example, wood pulp, organic short fibers, and the like. The active carbon fibers as described above preferably should 80% of the equilibrium adsorption amount within 20 minutes, when brought into contact with air at 25° C. and 50% relative humidity when the initial moisture content of the fibers is less than 5% by weight. If the above time period exceeds 20 minutes, there is such inconvenience that the dehumidification capacity per cycle can not be increased. More specifically, when the active carbon fibers having the above time period of 5 minutes and 40 minutes (per cycle) are employed, the fibers having an above defined adsorption in 5 minutes have a dehumidification capacity eight times that of those having an above defined adsorption within 40 minutes. Meanwhile, according to the present invention, a material prepared by causing a moisture adsorbing substance such as lithium chloride or the like to be supported on the active carbon fibers, may also be employed.

Referring now to the drawings, the present invention will be described in detail hereinbelow.

Although an absorbing or dehumidifying member employing the active carbon fibers according to the present invention is not particularly restricted in its construction, those having structures as follows are favorable from the viewpoint of increasing the dehumidification and cooling effects.

Firstly, there may be pointed out a multi-layer dehumidifying member produced by laminating in the same direction, a number of moisture absorbing elements each of which is formed by shaping a sheet of active carbon fibers as described earlier into a corrugated sheet, with another sheet made of active carbon fibers being applied onto one or both surfaces of said corrugated sheet so as to form a large number of parallel air passages.

FIG. 1 shows one example of the dehumidifying member as described above, in which a moisture adsorbing element 1 composed of the corrugated sheet 1a and the flat sheet 1b of active carbon fibers is rolled or wound spirally into the multi-layer dehumidifying member H, with many air passages 4 being defined therein in substantially the same direction as shown. In the actual application, the dehumidifying member H is assembled, for example, as shown in FIG. 2, in which the dehumidifying member H is arranged to be rotated counter-clockwise in a direction indicated by the arrow r by suitable means (not shown), while air to be dehumidified is introduced into a duct 2 fixedly disposed at one side of the member H in the direction indicated by an arrow C1 and is passed through the continuous air passages 4 of the dehumidifying member H so as to be dehumidified by the active carbon fibers during passing therethrough, and then, supplied in the direction shown by a dotted arrow C2 in the form of dry air through another duct 3 fixedly provided adjacent to and in alignment with the duct 2 at the other side of the dehumidifying member H. Meanwhile, hot air for regeneration of the active carbon fibers is directed into the member H in the direction indicated by an arrow A1 through a hot air duct 5 fixedly disposed below the duct 3 and adjacent to the other side of the member H so as to dehumidify the active carbon fibers as it passes through the air passages 4, and is then discharged in the direction indicated by an arrow A2 through another hot air duct 6 also fixedly disposed adjacent to the one side of the member H below the duct 2 and in alignment with the hot air duct 5.

By the above arrangement in FIG. 2, as the dehumidifying member H rotates, the dehumidification of air is effected in the air passages 4 which successively come into alignment with the ducts 2 and 3 by the active carbon fibers, while in the air passages 4 sequentially brought into alignment with the hot air ducts 5 and 6, moisture in the member H, i.e. in the active carbon fibers is removed for the regeneration thereof. Therefore, in the arrangement as described above, dehumidification and regeneration are to be continuously repeated.

Referring to FIG. 3, there is shown another application of the multi-layer dehumidifying member H, in which two dehumidifying members H1 and H2 are provided in series, with a heat exchanging member 7 being fixedly disposed between said dehumidifying members H1 and H2 as shown. The dehumidifying members H1 and H2 having a construction similar to that in FIG. 2 are arranged to be rotatable, while the heat exchanging member 7 which is fixed has its portion 8 formed into a sector shape for allowing air to be dehumidified to pass therethrough, so that the air to be dehumidified is cooled as it passes through the sector portion 8 by a cooling medium supplied through a pipe 9 extending outwardly from the peripheral surface of the member 7 for improving the dehumidifying efficiency. The heat exchanging member 7 has its portion 10 formed into a cavity for permitting the hot air for dehumidification and regeneration to readily pass therethrough. In the above arrangement of FIG. 3 also, air to be dehumidified is introduced through the duct 2 as indicated by the arrow C1, and is dehumidified as it passes through the dehumidifying member H1, heat exchanging member 7 and dehumidifying member H2 by the action of the active carbon fibers, and the air thus dehumidified is discharged through the duct 3 as shown by the arrow C2.

The size of each of the air passages 4 of the moisture adsorbing element 1, i.e. active carbon fiber corrugated sheet, should preferably be in the range of 1 mm$^2$ to 20 mm$^2$ in cross section. If the size thereof is larger than the above range, the dehumidification effect is reduced, although air passage resistance may be decreased, while on the other hand, if the size is smaller than the above range, the air passage resistance is increased, although the dehumidification effect is improved. A length of approximately 1000 mm is normally sufficient for the air passage 4. Moreover, the moisture adsorbing element 1, i.e. corrugated sheet made of active carbon fibers should preferably have unit weight in the region of 20 to 80 g/m$^2$ for effective application of the present invention. The dehumidifying member H having the construction as described above is effective for improving the dehumidifying efficiency, since it is not only free from pressure loss, but capable of increasing the adsorbing area.

Secondly, there may be considered another multi-layer dehumidifying member HB as shown in FIG. 4, which includes the moisture adsorbing elements 12 formed by corrugation of sheets made of active carbon fibers to provide many air passages 12c, and cooling air passing elements 11 formed by corrugated non-moisture adsorbing sheets applied with separate flat non-moisture adsorbing sheets on the opposite surfaces thereof to provide many air passages 11c therebetween, said moisture adsorbing elements 12 and cooling air passing elements 11 being alternately piled one upon another to form the dehumidifying member HB. In the arrangement of FIG. 4, the air passing elements 11 for passing cooling gas and the moisture adsorbing elements 12 for adsorbing moisture from a wet gas passing therethrough are alternately laminated, with the air passages 11c and 12c thereof intersecting at right angles to each other, but the arrangement may be so modified that said air passages intersect each other at an angle or slantwise. Furthermore, in the arrangement of FIG. 4, although the elements 12 and 11 made into a square configuration are piled one upon another to constitute the member HB, the shape of the elements 12 and 11 may be modified to be formed into rectangular shape, or a large number of the elements 12 and 11 may be combined to form the dehumidifying member, and thus, the construction thereof may suitably be changed in design according to the structures of the dehumidifying apparatuses. In the arrangement of FIG. 4, the wet air or gas is passed through the moisture adsorbing elements 12 as indicated by the arrow C1, while the gas for cooling is directed through the air passing elements 11 in the direction as shown by the arrow A1, and thus, from the discharge side of the moisture adsorbing elements 12, dehumidified air is supplied in the direction of the arrow C2.

The air passing element 11 and moisture adsorbing element 12 referred to above are respectively constituted in the manner as described hereinbelow.

More specifically, as shown in FIG. 5, to form the air passing element 11, a non-moisture adsorbing sheet, for example, a plastic film is corrugated through utilization of a corrugated board forming machine (not shown) to form the corrugated sheet 11a, and flat separating sheets 11b cut into a size generally corresponding to the shaped surfaces of the corrugated sheet 11a are applied or bonded to the opposite surfaces of said corrugated sheet 11a at the external faces of crests and valleys of the corrugation (in FIG. 5, the separating sheet 11b is shown only at one surface of the corrugated sheet 11a for clarity), and thus, the air passing element 11 is provided with the many air passages 11c defined between the corrugated sheet 11a and flat separating sheet 11b.

On the other hand, to form the moisture adsorbing element 12, as illustrated in FIG. 6, the corrugated sheet 12a of moisture adsorbing element is formed in the similar manner as described with reference to the corrugated sheet 11a of FIG. 5 to provide many air passages 12c when assembled. If necessary a flat separating sheet (not shown) made of the same moisture adsorbing material may further be bonded to the external faces of the crests or valleys of the corrugated sheet 12a to improve the dehumidifying efficiency.

The non-moisture adsorbing sheet which forms the air passing element 11 should preferably be made of a thermo-plastic synthetic resin film, for example films of polyethylene terephthalate, polypropylene, polyethylene, polycarbonate, polyamide, polyacrylic resin, etc. may be employed. The films as described above should have a heat resistance higher than 80° C., since regenerating hot air at 80° C. is passed therethrough for the regeneration of the moisture adsorbing element, and moreovr, raw materials having a sufficient chemical resistance should be selected for the films, in the case where the air to be dehumidified contains organic solvents or the like as in the industrial exhaust gases. Particularly, employment of a polyethylene terephthalate film is preferred for that purpose. Although such films as described above may be transparent or non-transparent, those produced through bi-axial stretching are desirable from the viewpoint of strength. Moreover, these films should preferably have thickness less than 100$\mu$. If the film thickness exceeds 100$\mu$, the adsorption heat produced during the dehumidification at the moisture adsorbing element 12 is not readily transferred to the side of cooling gas in the air passing element 11, and it may become more difficult to obtain dry air at a low absolute humidity.

Reference is had to FIG. 7 showing a schematic diagram for one example of a dehumidifying arrangement to which the dehumidifying member HB of FIG. 4 is applied for the dehumidification of air within a room R.

The arrangement of FIG. 7 includes a main portion 14 in the configuration of a closed box in which the dehumidifying member HG as described with reference to FIG. 4 is incorporated, and air passage connecting portions formed on the peripheral surfaces of the main portion 14 as described hereinbelow. In FIG. 7, the dehumidifying member HB is accommodated in the main portion 14 as it is laid sidewise, with gas sumps being formed at four corners of the main portion 14, and the air passages for the moisture adsorbing elements 12 are formed in the direction of the arrow C, while those for the air passing elements 11 are directed in the direction of the arrow A. Wet air in the room R coupled to the main portion 14 via a blower 15 is dehumidified through adsorption of moisture thereof by the moisture adsorbent of the dehumidifying member HB, and is returned to the room R in the form of dehumidified or dry air. Simultaneously, cooling air is fed into the dehumidifying member HB in the direction of the arrow A by a blower 16 coupled to the main portion 14 for absorption and removal of adsorption heat developed in the moisture adsorbing elements 12. When the adsorbent becomes ineffective, the blowers 15 and 16 are shut down, while a blower 17 is operated to supply hot air for regeneration towards the dehumidifying member HB for the regeneration of the moisture absorbing element. The exhaust gas is heat-exchanged with intake air at a heat exchanger 18 coupled to the main portion 14, while intake air for the regeneration is heated by an auxiliary heater 19 connected to the blower 17. In the case where it is not desired to stop the dehumidification in the room R during the regeneration, it may be so arranged that the dehumidifying member HB is provided in plurality for changing-over during use.

The dehumidifying member HB of FIG. 4 having the construction as described in the foregoing has a high dehumidifying effect, since the dehumidification is effected during elimination of the adsorption heat, and is capable of providing air at a low absolute humidity. It is to be noted that, upon lowering the temperature, the relative humidity is increased, and the higher the relative humidity is, the larger are the amount of adsorption and dehumidifying effect. It is further noted that the dehumidifying member HB as described with reference to FIG. 4 is capable of increasing its heat conducting area for the improvement of adsorbed heat eliminating effect. The dehumidifying member HB further has the advantages that the elements constituting the member HB, whose air passages are formed by the corrugated sheets, are light in weight, with an extremely small air passage pressure loss, and further, may be regenerated at a low temperature (60° to 80° C.) through employment of the active carbon fibers.

Incidentally, for eliminating moisture contained in air or gas, there have been employed various dehumidifying arrangements up to the present, most of which are adapted to cause wet gas to contact moisture adsorbents. For the moisture adsorbents, molecular sieves, silica gel, alumina, etc. generally in the granular configuration are employed in many cases. Therefore, for example, for the dehumidification of air, the moisture adsorbents as described above are accommodated in an air-permeable container for passing wet air therethrough so as to dry the air through adsorption of its moisture. On the other hand, when wet air is brought into contact with the moisture adsorbent, the temperature of the air is raised due to generation of adsorption heat, and the absolute humidity of air is not readily lowered due to decrease of relative humidity, with simultaneous reduction of the moisture adsorbing effect. Accordingly, during dehumidification by passing air, it is required to cool the moisture adsorbent layer, and for the above purpose, it is so arranged, for example, that heat is absorbed while a cooling medium is passed through a cooling coil, etc. provided in granular moisture adsorbent filled layers. The cooling means as described above, however, is not suitable for actual application, since moisture adsorbent filled layers of a large size are required, and since coiled pipes, etc. must be provided in the whole filling layers, thus resulting in the increase of the size of the dehumidifying arrangement, with consequent increase of cost involved in external facilities therefor. Owing to the facts as described above, it has been desired that the moisture adsorbent accommodating portion of the dehumidifying arrangement should be made compact in size, with an increased heat conducting area and high dehumidifying performance, and also with a small air passing resistance at high efficiency.

The problems related to the conventional arrangements as described above have been advantageously solved by the dehumidifying member HB according to the present invention as described earlier with reference to FIG. 4.

The dehumidifying member HB of FIG. 4, in which the moisture adsorbing elements 12 and the cooling air passing elements 11 are piled one upon another, with the respective air passages 11c and 12c thereof intersecting at right angles to each other, may further be modified into a rotary type hollow cylindrical dehumidifying member HC as shown in FIG. 8 in which moisture adsorbing elements 20 for passing wet gas therethrough to adsorb its moisture and cooling air passing elements 21 are alternately laminated one upon another, with air passages of the moisture adsorbing elements 20 directed in the axial direction and those of the cooling air passing elements 21 directed in the radial direction, for effecting continuous dehumidification.

The cooling air passing elements 21 and moisture adsorbing elements 20 as described above respectively have constructions as illustrated in FIGS. 9 and 10 which are generally similar to those of the air passing elements 11 and moisture adsorbing elements 12 for the dehumidifying member HB of FIGS. 5 and 6. As shown in FIGS. 9 and 10, for constituting the air passing element 21, a non-moisture adsorbing sheet, for example, a plastic film is corrugated with the use of the corrugated board forming machine as stated earlier to form the corrugated sheet 21a, and flat separating sheets 21b cut into a size generally corresponding to the shaped surfaces of the corrugated sheet 21a are bonded or fused to the opposite surfaces of said corrugated sheet 21a at the external faces of crests and valleys of the corrugation, and thus, the air passing element 21 is provided with many air passages 21c defined between the corrugated sheet 21a and flat separating sheet 21b along the direction of the corrugation.

Meanwhile, for constituting the moisture adsorbing element 20, the corrugated sheet 20a of active carbon fibers is formed in the similar manner as described with reference to the corrugated sheet 21a, and depending on necessity, a flat separating sheet 20b, which may be made of the same moisture adsorbing material, is bonded to one or both surfaces of the corrugated sheet 20b so as to define many air passages 20c therebetween.

It is to be noted here that, in the foregoing embodiments, although the corrugation of the corrugated sheets 20a and 21a is illustrated as in waveform, the shape of the corrugation may be altered as desired, for example, into a zigzag shape, saw-tooth shape, circular shape, curve or the like. For gradually decreasing the height of the respective air passages 20c and 21c towards the central axis of the cylindrical dehumidifying member HC as shown, the degree of corrugation or folding may be preliminarily altered, but the purpose may also be achieved by depressing a corrugated sheet formed with generally parallel corrugation, at its side adjacent to the axis of the member HC. For the shaping as described above, it may be so arranged, for example, that the neighboring elements placed in a retainer plate (not shown) or the like are bonded to each other, or the elements are divided into a suitable number of sections for subsequent assembling with the use of a gauge drum (not shown) and the like. Moreover, since the area of the air passages 21c for the cooling air passing element 21 at the side of the axis for the member HC is narrowed or decreased as the length of said air passages is increased, another cooling air passing element 21B of a smaller diameter may further be provided in the radial direction as shown in FIG. 9 for better air passing efficiency.

In the dehumidifying member HC having the construction as described above, a hollow portion 22 is formed at its central portion (FIG. 9), and with one side of the hollow portion 22 closed, the cooling gas is introduced, for example, as indicated by the arrow D1, while the wet gas is passed through the adsorbing elements 20 directed in the axial direction as indicated by the arrows C1 and C2 and taken out at the other side of the dehumidifying member HC in the form of the dry or dehumidified gas. Therefore, the cooling gas indicated by the arrow D1 is passed through the air passages 21c of the air passing elements 21 open into the hollow portion 22 and discharged from the peripheral surface of the dehumidifying member HC as indicated by the arrows D2 in the form of heat absorbing stream so as to absorb the adsorbing heat produced in the moisture adsorbing elements 20. In the above arrangement, since the air passages 20c and 21c are separated from each other, there is no possibility of mixing of the two streams. On the other hand, at a portion (preferably at the upper side) of the rotary type hollow cylindrical dehumidifying member HC, regeneration means G for the moisture adsorbing elements 20 is provided as shown in FIG. 8. In the embodiment of FIG. 8, the regeneration means G includes a frame member 25 provided to surround the upper portion of the dehumidifying member HC, and an inlet pipe 25a and an outlet pipe 25b extending outwardly from the frame member 25 in opposite directions. In the above arrangement, the gas for regeneration is introduced from the inlet pipe 25a as indicated by the arrow A1, and discharged from the outlet pipe 25b as shown by the arrow A2, after regenerating the moisture adsorbing element 20, and thus, the moisture adsorbent for the moisture adsorbing element 20 is efficiently regenerated. In the above arrangement of FIG. 8, although the flow direction A of the regeneration gas is indicated to be the same as the flow direction C of the wet gas, such flow directions A and C may be modified to be opposite to each other. Meanwhile, the moisture absorbing elements 20 and the air passing elements 21 described as piled up alternately one layer upon another in the foregoing embodiments may be modified to suit to intended designs, for example, in such a manner that a plurality of layers of the elements 20 and elements 21 are alternately laminated or blocks of the elements 20 and 21 alternately formed are suitably combined for the purpose.

On the other hand, a dehumidifying arrangement utilizing the dehumidifying member HC as described in the foregoing is required to be of such a construction that the dehumidifying member HC is replaceably accommodated for rotation so that the dehumidification is efficiently effected while the wet gas, cooling gas and regeneration gas are continuously passed therethrough.

In FIG. 11, there is shown one example of the dehumidifying arrangement M, which may satisfy the above requirements. The arrangement of FIG. 11 generally includes a box-like frame or housing 29 of closed type, and a rotary drum 30 rotatably provided in the housing 29, with the dehumidifying member HC according to the present invention being accommodated within the drum 30. The rotary drum 30 is fixedly mounted on a shaft 30a which is rotatably journalled at its one end, in a rear wall 29b-1 of the housing 29 for rotation, for example, in the counter-clockwise direction as shown by an arrow. Within the rotary drum 30, the dehumidifying member HC is held between side plates 30b and 30c of the drum 30, while said side plates 30b and 30c are respectively formed with openings (not particularly shown) in positions corresponding to the moisture adsorbing elements 20 of the member HC for allowing the wet gas to pass therethrough, with a perforated plate (not shown) being employed for the peripheral wall of the rotary drum 30 depending on necessity. Moreover, at the upper portion of the rotary drum 30, there is provided the frame 25 of the regeneration means G as described with reference to FIG. 8 for passing the regeneration gas therethrough in the direction indicated by the arrows A1 and A2. Meanwhile, towards the central hollow portion 22 of the dehumidifying member HC, one end 31e of a cooling air duct 31 fixed to the other side wall 29b-2 of the housing 29 is directed. The interior of the housing 29 is divided by partition walls 29h into a portion around the rotary drum 30 and another portion adjacent to the side walls 29b-1 and 29b-2 of the housing 29, and the portion around the drum 30 is utilized as a heat absorbing and desorbing portion for the cooling gas passing therethrough as indicated by the arrows D1 and D2 to be taken out from an exhaust duct 31d provided in the upper wall of the housing 29. Furthermore, to the spaces 29e and 29g provided at both sides of the rotary drum 30, an inlet duct 24c and an outlet duct 24b for the wet gas are coupled, and the wet gas is introduced into the inlet duct 24c as indicated by the arrow C1, and is taken out from the outlet duct 24b through the moisture adsorbing elements 20 directed in the axial direction, in the form of dry gas as shown by the arrow C2. By the employment of the rotary type dehumidifying member HC as described above, the continuous dehumidification effect is achieved, with a uniform cooling effect being provided in the dehumidifying cooling to be mentioned later.

Referring to FIG. 12, there is shown another embodiment of the dehumidifying arrangement according to the present invention in which a sheet of active carbon fibers formed into an endless belt-like configuration is gradually moved to adsorb moisture at its one portion during the movement, while the desorption of the moisture and regeneration of the active carbon fibers are effected at the other portion of said sheet. More specifically, in the arrangement MB of FIG. 12, the endless belt 32 of the active carbon fibers movably supported by a plurality of rollers is gradually moved in the direction indicated by arrows through a moisture adsorbing chamber 33 having an inlet port 33a and an outlet port 33b for wet air C to be treated and a moisture desorption chamber 35 also provided with an inlet port 35a and an outlet port 35b for air A for processing. As the endless belt 32 is gradually moved in the direction of the arrows, it is brought into contact with the wet air C to be dehumidified in the moisture adsorbing chamber 33 and the moisture in the air C is adsorbed by the active carbon fibers for the endless belt 32 so as to dry the air C, with simultaneous cooling by a cooling pipe 34 provided in the chamber 33 so as to pass cooling water therethrough. Meanwhile, in the moisture desorbing chamber 35, the active carbon fibers of the endless belt 32 is dried and regenerated as it is heated by solar heat or other heat sources such as waste heat and the like for evaporation of its moisture. The heated wet air A within the heat desorption chamber 35 may be either discharged as it is out of the system or utilized as a heat source for heating, hot water facilities, etc.

In FIG. 13 showing a further embodiment of the dehumidifying arrangement of the present invention, it is so arranged that wet air to be treated is brought into contact with one surface of an active carbon fiber sheet for obtaining dry air, while solar heat or heat from other sources is directed to the other surface of the active carbon fiber sheet so as to cause the moisture to move in the direction of thickness of said active carbon fiber sheet, and simultaneously, to effect the adsorption of moisture and regeneration of the active carbon fibers.

The dehumidifying arrangement MC of FIG. 13 generally includes a moisture adsorbing and desorbing chamber 36, and an active carbon fiber sheet 37 provided at the central portion of the chamber 37 so as to divide said chamber into a lower chamber 38b having an inlet port 38b-1 and an outlet port 38b-2 for the wet air C and an upper chamber 38a provided with an inlet port 38a-1 and an outlet port 38a-2 for processing air A. In the lower chamber 38b, the wet air C to be treated is introduced through the inlet port 38b-1 so as to be brought into contact with the one or lower surface of the active carbon fiber sheet 37 for being deprived of its moisture, and then, fed towards a cooling unit (not shown) in the form of a dry air. Meanwhile, in the upper chamber 38a, the active carbon fiber sheet 37 is heated by solar heat or heat by other heat sources, and the moisture adsorbed into the active carbon fiber sheet 37 in the lower chamber 38b is moved through said sheet 37 and evaporated from the upper surface of the sheet 37 in the upper chamber 38a. Accordingly, adsorption and desorption of the moisture may be simultaneously effected by the simple arrangement as in FIG. 13. Moreover, it is possible that heated air A in the upper chamber 38a is utilized as a heat source for a hot water unit and the like or that the arrangement of FIG. 13 is used for a heat collector as it is in winter time for the purpose of heating, etc.

As is seen from the foregoing description, by the employment of the dehumidifying members as described above, with adoption of the active carbon fibers as a moisture adsorbing material, dry air (i.e. air after the dehumidification) may be obtained efficiently. The dry air as described above is of such a state as is dried below absolute humidity of 0.015 kgH$_2$O/(kg air).

According to the present invention, it is possible to bring water into contact with the dry air thus obtained for humidification so as to provide cold water or cool air flow for effecting cooling. For contacting the dry air with water (i.e. the method of humidification), there may be employed such means that (1) cool air flow or cold water is obtained by bringing dry air into contact with water through counterflow contact, and also by cooling the other air by the air and/or water after the contact through the heat exchanging method, or (2) cool air flow or cold water is obtained by directly spraying water into the dry air.

In the former means, it is possible to efficiently produce cool air flow through employment of a cool air flow generating device which includes cool air flow generating elements formed by corrugating non-moisture adsorbing sheets and applying separating sheets to either one surface or both surfaces of each of the corrugated non-moisture adsorbing sheets to provide many parallel passages therebetween, with said elements being alternately laminated so that the respective air passages cross each other for effecting the counterflow contact between the dry air and water in one set of the passages, while air to be cooled is passed through the other set of the passages.

FIG. 14 shows one embodiment of the cool air flow generating device F of the present invention as described above. In the device F of FIG. 14, the cool air flow generating elements are alternately laminated one upon another in such a manner that the passages 39 for the counterflow contact between the dry air and water, and the passages 40 for introducing air to be cooled intersect each other. For the material constituting the cool air generating elements, there may be employed metals, thermoplastic synthetic resin films, etc., of which the thermoplastic synthetic resin films are preferable from the viewpoints of facilitation of manufacture and handling. The films which may be adopted include polyethylene terephthalate, polypropylene, polyethylene, polycarbonate, polyvinyl chloride, polyamide, polyacrylonitrile, and the like, and for the application, for example, to cooling of organic solvent industrial gas, etc., films superior in chemical resistance are suitable as stated earlier.

Referring to FIG. 15, there is shown one example of arrangements for obtaining cool air flow through employment of the cool air flow generating device F of the present invention described above with reference to FIG. 14.

In FIG. 15, the arrangement W includes a housing h of a generally cubic box-like configuration, and the cool air flow generating device F of FIG. 14 disposed at the central portion of the housing h, with four sides of the device F being separated by partition walls s within the housing h so as to be respectively communicated with corresponding connecting ports 41, 42, 43 and 44 provided at opposite sides of the housing h as shown.

In the above arrangement, when water is sprinkled through the connecting port 41, and air dried by the dehumidifying member (not shown here) as described earlier is introduced from the connecting port 42, water is discharged from the connecting port 42 through the passages 39 of the device F, while the dry air is discharged from the connecting port 41 also through the device F. In the above case, water and the dehumidified air are subjected to the counterflow contact in the passages 39 of the device F, and air after the contact is cooled down to the wet bulb temperature. On the other hand, when air in the room (not shown) is directed into the passages 40 of the device F through the connecting port 43, the air is cooled by the heat exchanging through the above passages and film surfaces in the device F, and then, discharged through the connecting port 44. The cool air flow thus obtained is fed into the room for cooling of the room interior, while the air in the room is successively supplied into the connecting port 43, and thus, air is circulated by repeating the above procedures for efficient cooling of the room interior.

Reference is also made to FIG. 16 schematically showing one example of a room interior cooling system which employs the cool air flow generating arrangement W as described above with reference to FIG. 15. In the cooling system of FIG. 16, water contained in a tank 45 is drawn up by a liquid circulating pump 46 connected thereto and sprinkled into the connecting port 41 of the arrangement W through a piping leading from the pump 46. Meanwhile, the dry air is fed by a blower 47a into the connecting port 42 of the arrangement W through an intake and exhaust nozzle 48a for the arrangement W. Water and the dehumidified air are brought into the counterflow contact in the passages 39 of the cool air flow generating device F accommodated in the arrangement W, while the air after the contact is discharged into atmosphere through the intake and exhaust nozzle 48b. The water passing through the arrangement W is again collected into the tank 45 for recirculation. In the above case, since part of the water is evaporated in the arrangement W into a gas form, with consequent reduction of water level, the tank 45 is replenished with water through a water feeding pipe 49 connected thereto. On the other hand, the air in the room R is fed by another blower 47b into the connecting port 44 of the arrangement W via the intake and exhaust nozzle 48c so as to be cooled in the arrangement W and is again supplied into the room R through the connecting port 43 and via the nozzle 48d for repeated circulation in the manner as described above.

According to the arrangement of the present invention, since the two set of passages of the cool air flow generating device F are respectively utilized for the counterflow contact between air and water in one set of the passages, and for the heat exchange through wall faces of the passages by causing air to flow in the other set of the passages, the humidity of air is not increased even if the cooling effect is raised, and thus, dry cool air flow is obtained at all times, without increasing the absolute humidity. Meanwhile, since the operations for obtaining cold water and for the heat exchange may be effected simultaneously, the arrangement is made compact in size and light in weight, and readily installed as compared with conventional cooling towers, thus being more economical, with reduction of manufacturing cost.

Referring further to FIG. 17, there is shown another example of the cooling system for obtaining cool air flow or cold water by directly spraying water into dry air through employment, for example, of the dehumidifying arrangement M of FIG. 11 utilizing the rotary type dehumidifying member HC (FIG. 8).

In the system of FIG. 17, for cooling the interior of the room R, wet air in the room R is fed to the dehumidifying arrangement M through a blower 52 as indicated by the arrow C1 via piping leading to said arrangement M. In the above case, although it is possible to return the dehumidified dry air whose moisture is adsorbed back to the room R through a duct 53 as described earlier, this embodiment is particularly arranged to effect dehumidification and cooling of the air in the room R. More specifically, there is provided a water spouting tower 54 which is coupled to the dehumidifying arrangement M, and also to room R through a cold accumulator 56 and into which dry air is introduced in the direction of the arrow C2 to be brought into direct contact with water which is being sprayed for absorption of moisture and then, again returned into the room R. Meanwhile, cooling air indicated by the arrow D1 is introduced into the central hollow portion of the dehumidifying member of the arrangement M for absorption and taking out of the adsorption heat, which is led into a suitable heat exchanging device (not shown) for recovery depending on necessity. On the other hand, for the regeneration gas to be introduced into the arrangement M by a blower 55 as indicated by the arrow A1, air heated through utilization of solar heat may be favorably employed. Water for a medium in the cold accumulator 56 is fed to the water spouting toner 54 by a pump 57 so as to be sprayed therein, and the sprayed water is cooled as it comes into contact with the dry air to be derived from the dehumidifying arrangement M. Accordingly, cooling of the interior of the room R is effected by indirectly cooling the air in the room R fed by a blower 58 into a heat conducting pipe provided in the water spouting tower 54 or by indirectly cooling the same with the use of the cold water in the cold accumulator 56 through the action of the pump 59.

Referring further to FIG. 18, there is shown a further example of the cooling system in which the cooling is effected by directly spraying water into the dry air with the employment of the dehumidifying arrangement MB of FIG. 12.

In the system of FIG. 18 generally including a cold water tower 60, a heat accumulator tank 63, a cold radiation chamber 64 and a heat accumulator tank 65 which are coupled to the dehumidifying arrangement MB, the dry air having its moisture adsorbed by the endless belt 32 of active carbon fibers is fed to the cold water tower 60 as indicated by the arrow C so as to be discharged from a discharge pipe 61 provided at the bottom portion of the tower 60, while water is sprinkled from a water discharge pipe 62 provided at the top portion of the tower 60, and the discharged air absorbs moisture upon contact with water, and thus, water is cooled close to the wet bulb temperature at the air temperature so as to be fed into the cold accumulator tank 63 for being again supplied into the cold water tower 60 to be cooled through heat exchange with the cooling water. Meanwhile, the wet air which has absorbed moisture in the cold water tower 60 is again fed to the moisture adsorbing chamber 33 of the dehumidifying member MB so as to have its moisture adsorbed as described earlier for being recircultated.

The water cooled by the heat exchange at the cold accumulator tank 63 cools the cold radiation chamber 64, and is again returned to the cold accumulator tank 63 to be cooled for recirculation. On the other hand, the air after the contact with water in the cold water tower 60 is also cooled close to the wet bulb temperature, and is fed to the cold radiation chamber 64 so as to be used for the cooling purpose. The air which is heated in the moisture adsorbing chamber 35 and has absorbed the moisture may be discharged as it is out of the system, but may be fed to the heat accumulator chamber 65 as indicated by the arrow A for heat exchange with water for the heating or for a hot water unit, and recirculated back to the chamber 35 of the dehumidifying arrangement MB.

The various advantages which are achieved by the dehumidifying method and dehumidification and cooling system of the present invention may be summarized as follows.

(1) Since no high pressure devices, or particular chemicals, etc. are employed, the method and system of the present invention are very safe, without pollution of the environment.

(2) The active carbon fiber sheet employed in the shape of a film is readily processed and handled, and owing to the arrangement for causing air to flow in the direction parallel to said sheet, the air passage resistance is small, with consequent reduction of pressure loss, and therefore, the capacity of blowers for moving air may be lowered for extremely favorable energy efficiency.

(3) Since the regenerating temperature for the active carbon fibers is as low as less than 80° C., the construction of the moisture adsorbing and desorbing device is markedly simplified, and thus, solar heat or waste heat from factories, etc. may be efficiently utilized, which feature is extremely desirable from the view point of energy saving.

(4) The active black carbon fibers may be simultaneously utilized as a moisture adsorbing material and as a solar heat collector, and therefore, have an advantage in that they are used for heating or in water heating system through utilization of the accumulated heat.

(5) Since the active carbon fibers adsorb water remarkably fast as compared with known moisture adsorbents such as molecular sieves, silica gel, etc., the time required for dehumidification per cycle is considerably reduced, and thus, not only the dehumidifying capacity is markedly improved, but the dehumidifying arrangement may be made compact in size.

Hereinbelow, EXAMPLES are inserted for the purpose of illustrating the present invention, without any intention of limiting the scope thereof.

EXAMPLE 1

With the employment of the cooling system as described with reference to FIG. 18, operations are effected under the conditions as follows.
(1) Active carbon fiber sheet
  Endless belt: 2.00 m in width and 4.5 m in length
  Area of adsorbing portion: 2 m×2 m
  Area of desorbing portion: 2 m×2 m
  Distance between adsorbing and desorbing layers: 0.25 m
  Sizing: 200 gr/m$^2$
  Heat collecting area (solar heat): 4 m$^2$
  Belt moving speed: 1 complete run/10 minutes
(2) Cold water tower
  At inlet: air temperature about 30° C., relative humidity about 20% (0.005 kgH$_2$O/(kg air))
  At outlet: air temperature about 20° C., relative humidity about 100%
  Circulating air amount: 3 m$^3$/minute
  Available cold water temperature: approximately 20° C.

The cooling capacity achieved when the cold water obtained under the above conditions was fed to the cold radiating device, was approximately 800 Kcal/hr (operation at 8 hr/day).

EXAMPLE 2

(1) A paper material solution prepared by 70 parts by weight of active carbon fibers having cellulose fibers as a precursor, and 30 parts by weight of polyacrylonitrile pulp was processed by a known paper-making machine to obtain active carbon fiber sheets with sizing of 50 gr/m$^2$, while films of polyethylene terephthalate each 50$\mu$ in thickness were separately prepared. With the use of the above two kinds of sheets, corrugated board-like sheets (for the moisture adsorbing elements) having the corrugated sheet of the active carbon fibers were produced by a known one sided corrugated board forming machine. Subsequently, by using the same corrugated board forming machine as described above, corrugated board-like sheets (for the air passing elements) of polyethylene terephthalate with thickness of 50$\mu$ were prepared. The above two kinds of corrugated board-like sheets were alternately laminated one upon another with their air passages intersecting at right angles to each other to prepare a cubic dehumidifying member HB as shown in FIG. 4 having its one side of 30 cm. Air at a temperature of 25° C. and a relative humidity of 80% was fed into the moisture adsorbing element side of the dehumidifying member HB, while atmospheric air at temperature of 25° C. was passed through its air passing element side for cooling. The air dehumidified under the above conditions had a temperature of 25° C., with the relative humidity thereof lowered down to 15%. The absolute humidity thereof was 0.003 kg-H$_2$O/kg-dry air. Meanwhile, it was found that, when the adsorbent became ineffective, and the relative humidity of air is raised up to 30%, said adsorbent may be recovered to the original state by supplying thereto heated air at 70° C. for about 10 minutes, with feeding of the cooling air and dehumidified air suspended.

(2) With employment of the same dehumidifying member as described above, experiments was made under the similar conditions, but with the cooling air stopped. The dehumidified air obtained had a temperature of 32° C. and a relative humidity of 20%.

EXAMPLE 3

A rotary type dehumidifying member (as shown in FIGS. 2 and 3) was formed by winding a mat of active carbon fibers having cellulose fibers as a precursor around a rotary shaft so as to maintain a mat distance of about 3 mm. Air (temperature 25° C., relative humidity 90%) in a closed room was supplied to the above dehumidifying member which was being rotated at a speed of above 20 revolutions/hour, and the dehumidified air discharged therefrom was cooled so as to be returned into the room for circulation. Meanwhile, air outside the room was heated up to 90° C. and supplied to part of the rotary type dehumidifying member for regeneration thereof when the above procedure was continued, the relative humidity of the air in the room was lowered to 55% (air temperature 25° C.).

EXAMPLE 4

A paper material solution prepared by 70 parts by weight of active carbon fibers having cellulose fibers as a precursor, and 30 parts by weight of polyacrylonitrile pulp was processed by a known paper-making machine to obtain active carbon fiber sheets with sizing of 50 gr/m$^2$. The sheets thus obtained were formed into one sided corrugated board configuration by using the known one sided corrugated board forming machine. The above corrugated sheet was wound around a rotary shaft to prepare the rotary type dehumidifying member similar to that in EXAMPLE 3. Upon operation under the same conditions as in EXAMPLE 3, the relative humidity of the air in the room was lowered to 60% (air temperature 25° C.).

EXAMPLE 5

The rotary type dehumidifying member obtained in EXAMPLE 4 was dipped in a lithium chloride solution at 10% by weight, with subsequent drying, and thus, the rotary type dehumidifying member on which lithium chloride was supported was obtained. When the operation was effected under the same conditions as in EXAMPLE 3 (or 4) with the employment of the rotary type dehumidifying member thus prepared, the relative humidity of air in the room was lowered to 30% (air temperature 25° C.). Meanwhile, when the air was brought into contact with water in the cold water tower, cooling air flow at a temperature of 18° C. was obtained.

EXAMPLE 6

With the use of polyethylene terephthalate films of 50$\mu$ in thickness, the cubic cool air flow generating device F as shown in FIG. 14 having its one side of 25 cm was formed so as to constitute the cool air flow generating arrangement W as described earlier with reference to FIG. 15. From the connecting port 41 thereof (FIG. 15), water is fed at the rate of 100 cc/min., while the water flowing out from the connecting port 42 was received in a tank for recirculation. On the other hand, air at temperature of 27° C. and relative humidity of 40% was supplied through the connecting port 42 at the rate of 120 m³/hr., and further, air at the same temperature and relative humidity (27° C., 40%) was also fed through the connecting port 44 at the same rate of 120 m³/hr, whereby cool air flow at 19° C. was obtained from the connecting port 43.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of dehumidification which comprises the steps of preparing a dehumidifying member composed of active carbon fiber material, in the form of sheets and bringing air to be dehumidified into contact with said dehumidifying member for the dehumidification of air.

2. A method as claimed in claim 1, wherein said dehumidifying member is composed of sheets of active carbon fiber material which reaches 80% of its equilibrium moisture absorption in less than 20 minutes in air at a temperature 25° C. having a relative humidity of 50% when the initial moisture content of the fibers is less than 5% by weight.

3. A method as claimed in claim 1, wherein said dehumidifying member includes moisture adsorbing elements which are each formed by corrugating a sheet made of active carbon fibers and applying a separate sheet also made of active carbon fibers to one or both surfaces of said corrugated sheet so as to provide a large number of air passages therebetween, with said moisture adsorbing elements being laminated in plurality one upon another in the same direction.

4. A method as defined in claim 3, wherein each of said air passages of said moisture adsorbing element has a cross sectional area in the range of 1 to 20 mm².

5. A method as claimed in claim 3, wherein said sheet made of active carbon fibers has a unit weight in the range of 20 to 80 g/m².

6. A method as claimed in claim 1, wherein said dehumidifying member includes moisture adsorbing elements each formed by corrugating a sheet made of active carbon fibers, and cooling air flow passing elements each formed by corrugating a sheet made of non-moisture adsorbing material and applying a separate sheet of non-moisture adsorbing material to both surfaces of said corrugated sheet of the non-moisture adsorbing material so as to define a large number of air passages therebetween, with said moisture adsorbing elements and cooling air flow passing elements being alternately laminated one upon another to constitute said dehumidifying member.

7. A method as claimed in claim 6, wherein said corrugated sheet of the active carbon fibers for each of said moisture adsorbing elements further includes a separate sheet of active carbon fibers applied to one or both surfaces thereof.

8. A method as claimed in claim 6, wherein said moisture adsorbing elements and cooling air flow passing elements for said dehumidifying member are alternately laminated one upon another so that the respective air passages thereof intersect at right angles to each other.

9. A method as claimed in claim 8, wherein said dehumidifying member is formed into a hollow cylindrical configuration, said respective air passages of said moisture adsorbing elements and cooling air flow passing elements being alternately arranged to be directed in the axial direction and radial direction of said hollow cylindrical configuration.

10. A method as claimed in claim 6, 7, 8 or 9, wherein said sheet made of active carbon fibers has a unit weight in the range of 20 to 80 g/m².

11. A method as claimed in claim 6, 7, 8 or 9, wherein each of said air passages of said moisture adsorbing element has a cross sectional area in the range of 1 to 20 mm².

12. A method as claimed in claim 6, 7, 8 or 9, wherein said sheet of non-moisture adsorbing material is made of thermo-plastic synthetic resin film.

13. A method as claimed in claim 12, wherein said thermo-plastic synthetic resin film has a thickness less than 100μ.

14. A method as claimed in claim 12, wherein said thermo-plastic synthetic resin film is of polyethylene terephthalate film.

15. A method as claimed in claim 1, 2, 3, 4, 5, 6, 7, 8, or 9, wherein the air after the dehumidification is brought into contact with water so as to obtain cool air flow or cold water.

16. A method as claimed in claim 15, wherein the air after the dehumidification is brought into contact with water by directly spraying water thereinto.

17. A method as claimed in claim 15, wherein the dehumidified air is brought into counterflow contact with water, the air and/or water after said counterflow contact being utilized for cooling other air through heat exchange so as to obtain cool air flow or cold water.

18. A method as claimed in claim 1, wherein said dehumidifying member is a cool air flow generating device which is constituted by cool air flow generating elements each formed by corrugating a sheet of non-moisture adsorbing material and applying a separate sheet of the same non-moisture adsorbing materials to one or both surfaces of said corrugated sheet to provide a large number of passages therebetween, said cool air flow generating elements being alternately laminated one upon another, with the respective passages thereof intersecting each other, for constituting said cool air flow generating device so as to effect counterflow contact between the dehumidified air and water in one set of the passages and to cause air to be cooled to pass through the other set of the passages.

19. A method as claimed in claim 18, wherein said sheets of the non-moisture adsorbing material is made of thermo-plastic synthetic resin films.

20. An air dehumidifying arrangement which comprises a pair of dehumidifying members axially aligned and rotatably provided in a spaced relation from each other, each of said dehumidifying members being formed by a moisture adsorbing element which is composed of a corrugated sheet of active carbon fibers and a flat separate sheet of active carbon fibers bonded to one surface of said corrugated sheet, and which is spirally wound to form said dehumidifying member, with air passage defined therebetween being arranged in substantially the same direction, and a heat exchanging member fixedly disposed coaxially between said dehumidifying members and having one portion which allows air to be dehumidified to pass therethrough and through which cooling medium is passed for cooling the air to be dehumidified, and another portion for permitting hot air for dehumidification and regeneration of the active carbon fibers to pass therethrough.

21. An air dehumidifying arrangement which comprises a rotatable hollow cylindrical dehumidifying member composed of moisture adsorbing elements each formed by a corrugated sheet of active carbon fibers and cooling air flow passing elements each formed by a corrugated sheet of non-moisture adsorbing material and a separate flat sheet of non-moisture adsorbing material applied to both surfaces of said corrugated sheet of non-moisture adsorbing material so as to define a large number of air passages therebetween, with said moisture adsorbing elements and cooling air flow passing elements being alternately laminated one upon another so that the respective air passages of said moisture adsorbing elements and said cooling air flow passing elements are alternately arranged to be directed in the axial direction and radial direction of said hollow cylindrical dehumidifying member so as to pass the air to be dehumidified through said moisture adsorbing elements and to pass cool air through said cooling air flow passing elements, and a regenerating means provided to surround one portion of said rotatable hollow cylindrical dehumidifying member for regenerating active carbon fibers of said moisture adsorbing elements by passing regeneration gas through said moisture adsorbing elements.

* * * * *